Oct. 28, 1924.  1,513,568
E. TALBOT
PISTON FOR USE IN FLUID PRESSURE ENGINES
Filed May 31, 1922

INVENTOR
ERNEST TALBOT
Spear, Middleton, Donaldson, Hoag
PER
ATTORNEY.

Patented Oct. 28, 1924.

1,513,568

UNITED STATES PATENT OFFICE.

ERNEST TALBOT, OF LOWESTOFT, ENGLAND.

PISTON FOR USE IN FLUID-PRESSURE ENGINES.

Application filed May 31, 1922. Serial No. 564,813.

*To all whom it may concern:*

Be it known that I, ERNEST TALBOT, a subject of the King of England, residing at Lowestoft, in the county of Suffolk, England, have invented certain new and useful Improvements in Pistons for Use in Fluid-Pressure Engines, of which the following is a specification.

This invention relates to pistons for use on fluid pressure engines, particularly internal combustion engines, of the kind in which the piston comprises a head part carrying the packing rings, and a body or bearing part in the form of a skirt or slippers provided with a radial flange adapted to be secured to a corresponding flange on an extension of the head part, such extension being less in width than the diameter of the head.

It is the principal object of the invention to provide a construction of piston, which, while being of a light and hard wearing nature, possessing good heat dissipating properties, and formed so that risk of distortion under heat is minimized, is also of a nature which posseses considerable manufacturing advantages, particularly for replacement purposes by reducing cost of construction and avoiding multiplicty of patterns or dies for manufacture. Other advantages will be hereunder more particularly pointed out.

According to this invention, an intermediate member is employed between the head and the bearing portion, and may constitute either an additional bearing element, or a part formed with bosses to carry the gudgeon pin, or a distance or packing piece adapted merely to vary the distance between the head piece and gudgeon pin bosses independently formed or carried by the bearing element. In this way pistons can be built up from standardized parts which for a given diameter are interchangeable, thus making it possible economically to provide from stock parts, pistons to suit different types of engines, or to produce different compressions suitable either for touring or racing purposes.

Where the intermediate member is intended to form an additional bearing element it may carry at one end a radial flange adapted to be secured between the respective flanges of the head piece and the usual bearing element. The additional bearing surface would then extend from the flanged connection towards the head, while the usual bearing surfaces would extend in the opposite direction.

The employment of the intermediate member makes it possible to provide considerable variations in the general design of the piston to suit various purposes or types of engines. Thus, for example, the bearing portion may form a sleeve which encircles the reduced part extending from the ring-carrying part so that where the extension is of circular cross-section an annular space exists between the two parts, which space, if desired, may be sealed by the employment of a spring packing ring preferably located between the adjacent edges of the rubbing portion and the ring-carrying portion. Such sealing of the annular space renders a piston according to this invention suitable for use in two-stroke engines or the like.

In the case of a "slipper" piston, the bearing portion would not extend completely around the walls of the cylinder, but would be attached to the extension of the ring-carrying part at opposite sides of the piston.

The metals or alloys employed in the construction of the piston may be chosen from any of the known or suitable materials. Thus, for example, the ring-carrying portion may be one of the known aluminium alloys, while the rubbing portion may be formed of hard cast iron, or of steel having a high carbon content, but it is to be understood that the invention is not limited to any particular metals or combination of metals. It will be evident therefore, that it is possible to select a material for the ring-carrying portion which will be light and will readily dissipate the heat imparted to it, while the portion which rubs upon the cylinder may be formed of a material which is well adapted to resist wear and to withstand the side thrust imparted from the piston rod, while at the same time being so spaced apart from the ring-carrying part that there is little fear of distortion affecting it through heat transmitted.

The manner of carrying out the invention is illustrated in the accompanying drawings, in which—

Like letters indicate like parts throughout the drawings.

Figure 1:
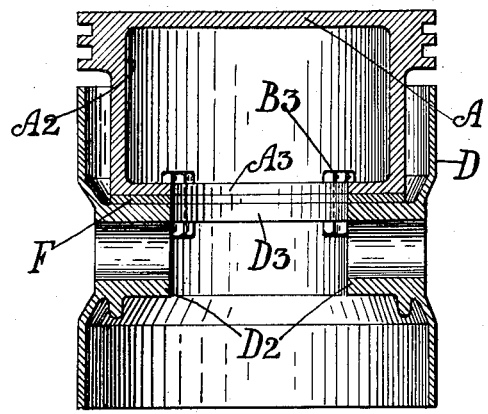
Figures 1 and 2 are respectively similar views of a modified construction in which the bearing part carries the piston pin bosses and the intermediate member is a distance piece.
Figure 2:
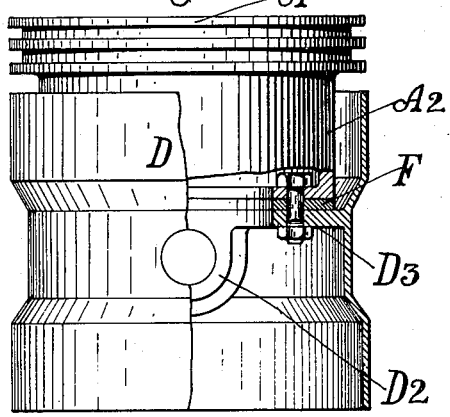

In Figures 1 and 2 the bosses $D^2$ for the piston pin are formed integrally with a one-piece bearing portion D, and in this case the intermediate member is constituted by a washer F or like distance piece which is inserted between the connecting flanges $A^3$ and $D^3$ of the head part A and bearing part D respectively, thereby to vary the distance between the crown of the piston and the plane of the piston pin axis. This is an important feature of the invention and enables a piston of a given diameter and formed of stock parts to be readily adapted to various kinds of engines as a replacement or for the purpose of varying the compression of the engine, thereby readily to adapt the engine to conditions suitable for racing or touring motor vehicles. An added advantage is that in manufacture the number of patterns or dies required in the construction of the piston can be reduced to a minimum, and indeed finished portions may be stocked which can be readily connected together to produce the desired vital dimensions of the piston.

This washer F also simplifies the equalization of the weights of a set of pistons for a multi-cylinder engine as it permits of reducing its weight by drilling holes through it thus avoiding re-chucking of the piston or the drilling of holes through a bearing surface already reduced to a minimum area.

The proposed construction of the bosses for the piston pin upon the bearing portion instead of upon the ring-carrying portion is of considerable advantage in some forms of piston, as, for example, in those where the piston pin is not rigidly mounted in the bosses, but floats therein, either through attachment to the connecting rod or through being free in both the piston and the connecting rod.

Figure 3:
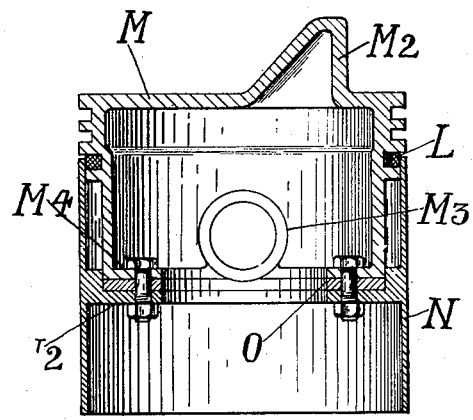
Figure 3 is a piston specially adapted for use in two-stroke engines.

A slight gap is preferably left between the bearing portion and the ring-carrying portion at the part of the former which is adjacent to the piston rings, but in the case of a two-stroke engine where the piston controls the ports in the walls of the cylinder, leakage at this gap must be prevented, and therefore, as shewn in Figure 3, a spring packing ring L is employed at this space between the ring-carrying part M and the one-piece bearing part N to form a pressure tight seal, thus preventing leakage in the annular space between the two parts of the piston.

This piston has the usual deflector $M^2$ upon the crown, and the intermediate member is constituted by the distance piece O in the form of a ring. The piston bosses $M^3$ may be upon either this ring or the head part or the rubbing part whose respective flanges are at $M^4$ and $N^2$.

It will be seen that the invention, besides providing all the advantages obtainable from the combination of a light alloy for the ring-carrying portion and a hard wearing material for the rubbing parts, provides for reduction of manufacturing costs in a simple manner, and enables a piston to be built up from stock parts in a manner adapted to suit various conditions and various kinds of engines, the parts being so connected together that there is little risk of distortion through heat transmitted, while at the same time each is readily renewable if necessary.

Furthermore, the adjustments for uniformity of weight of the pistons of a multi-cylinder engine can readily be made upon the intermediate member in the manner proposed above.

What I claim as my invention and desire to secure by Letters Patent of the United States is:—

In a piston, the combination of a head part carrying packing rings, an extension of said head part having a diameter less than the diameter of said head part, a radial flange around said extension, a body part in the form of a sleeve constituting the bearing element of the piston, an inwardly directed radial flange around the interior of said body part and located intermediate of its ends, adapted to connect with said flange upon said head part, one end of said body part encircling said extension leaving an annular space between and having its end faces adjacent the end face of said head part, an intermediate member constituting a distance piece interposed between said flanges of said head part and said body part, fastenings connecting said flanges and said distance piece, and a packing ring mounted in said extension to bear against the inner periphery of said body part, substantially as set forth.

In testimony whereof I have signed my name to this specification in the presence of two subscribing witnesses.

ERNEST TALBOT.

Witnesses:
CECIL B. TOOKE,
W. M. EMERSON.